(12) United States Patent
Kwok et al.

(10) Patent No.: US 7,947,123 B2
(45) Date of Patent: May 24, 2011

(54) IMPACT FILTER WITH GREASE TRAP

(75) Inventors: Kui-Chiu Kwok, Gurnee, IL (US); Russell Robison, Yamhill, OR (US)

(73) Assignee: Illinois Tool Works Inc., Glenview, IL (US)

( * ) Notice: Subject to any disclaimer, the term of this patent is extended or adjusted under 35 U.S.C. 154(b) by 278 days.

(21) Appl. No.: 11/936,935

(22) Filed: Nov. 8, 2007

(65) Prior Publication Data

US 2008/0110339 A1    May 15, 2008

Related U.S. Application Data

(60) Provisional application No. 60/857,961, filed on Nov. 10, 2006.

(51) Int. Cl.
*B01D 45/00* (2006.01)
(52) U.S. Cl. ............. 95/267; 55/445; 55/446; 55/443; 55/442; 55/467; 55/423; 55/DIG. 36; 96/224; 126/300; 126/299 R; 126/299 C; 126/299 D; 126/299 F
(58) Field of Classification Search .......... 55/445, 55/446, 443, 442, DIG. 36, 467, 423; 95/267; 96/224; 126/299 R, 300, 299 C, 299 D, 299 F
See application file for complete search history.

(56) References Cited

U.S. PATENT DOCUMENTS

| | | | |
|---|---|---|---|
| 768,415 A | 8/1904 | Wingrove | |
| 1,400,860 A * | 12/1921 | Brown | 55/432 |
| 2,387,473 A * | 10/1945 | Spitzka | 96/233 |
| 2,523,529 A | 9/1950 | Zwickl | |
| 3,364,664 A * | 1/1968 | Doane | 55/394 |
| 3,400,649 A * | 9/1968 | Jensen | 126/299 D |
| 3,494,108 A * | 2/1970 | Moragne | 96/233 |
| 3,566,585 A * | 3/1971 | Voloshen et al. | 55/435 |
| 3,616,744 A * | 11/1971 | Jensen | 126/299 E |
| 3,813,856 A * | 6/1974 | Jensen | 55/444 |
| 3,870,494 A * | 3/1975 | Doane | 55/443 |
| 3,889,581 A * | 6/1975 | Bray, Sr. | 126/299 E |
| 3,910,782 A * | 10/1975 | Struble et al. | 55/444 |
| 3,945,812 A | 3/1976 | DeWitt | |
| 3,955,949 A * | 5/1976 | Rohrer | 55/444 |
| 4,008,060 A * | 2/1977 | Andreae | 55/446 |
| 4,022,118 A * | 5/1977 | Vandas | 126/299 E |
| 4,043,319 A * | 8/1977 | Jensen | 126/299 D |
| 4,089,327 A * | 5/1978 | Welsh | 126/299 D |
| 4,101,299 A * | 7/1978 | Bertucci | 96/228 |
| 4,105,422 A | 8/1978 | Kiguchi | |
| 4,231,765 A * | 11/1980 | Scott | 95/26 |
| 4,281,635 A * | 8/1981 | Gaylord | 126/299 D |
| 4,475,534 A * | 10/1984 | Moriarty | 126/299 D |
| 4,830,644 A | 5/1989 | Gutermuth | |
| 4,944,782 A | 7/1990 | Rajendran et al. | |
| 4,955,995 A * | 9/1990 | Pontius | 96/117.5 |
| 5,141,538 A | 8/1992 | Derington et al. | |

(Continued)

FOREIGN PATENT DOCUMENTS

DE    4427074 A1    2/1996

*Primary Examiner* — Jason M Greene
*Assistant Examiner* — Dung Bui
(74) *Attorney, Agent, or Firm* — Taylor IP

(57) ABSTRACT

An impact filter suitable for a kitchen exhaust hood is provided with a grease trap to capture grease particles and channel the particles away. The trap can be of different configurations. The filter can be used in various system layouts.

24 Claims, 12 Drawing Sheets

U.S. PATENT DOCUMENTS

| | | | |
|---|---|---|---|
| 5,183,481 A | 2/1993 | Felder | |
| 5,342,422 A * | 8/1994 | Wimbock | 55/444 |
| 5,352,257 A * | 10/1994 | Powers | 55/444 |
| 5,472,342 A | 12/1995 | Welsh, II et al. | |
| 5,522,377 A * | 6/1996 | Fritz | 126/299 R |
| 5,536,288 A | 7/1996 | DeWitt et al. | |
| 5,632,806 A * | 5/1997 | Galassi | 96/16 |
| 5,662,097 A * | 9/1997 | Panos | 126/299 E |
| 5,718,219 A * | 2/1998 | Boudreault | 126/299 E |
| 6,041,774 A * | 3/2000 | Ward et al. | 126/299 D |
| 6,058,929 A * | 5/2000 | Fritz | 126/299 R |
| 6,071,472 A * | 6/2000 | Caupin et al. | 422/4 |
| 6,125,841 A * | 10/2000 | Boudreault | 126/299 D |
| 6,223,741 B1 * | 5/2001 | Panos | 126/299 E |
| 6,235,090 B1 * | 5/2001 | Bernstein et al. | 96/57 |
| 6,290,742 B1 | 9/2001 | Pakkala et al. | |
| 6,402,817 B1 | 6/2002 | Bergman | |
| 6,454,825 B1 * | 9/2002 | Cheimets et al. | 55/446 |
| 6,623,551 B2 | 9/2003 | Klobucar et al. | |
| 6,656,244 B1 | 12/2003 | Galassi | |
| 6,746,503 B1 | 6/2004 | Benett et al. | |
| 6,840,975 B2 * | 1/2005 | Bohacik | 55/442 |
| 7,422,613 B2 * | 9/2008 | Bockle et al. | 55/318 |
| 7,571,721 B2 * | 8/2009 | Aviles | 126/299 D |
| 7,581,539 B2 * | 9/2009 | Aviles | 126/299 D |
| 2002/0162773 A1 | 11/2002 | Kim et al. | |
| 2002/0179084 A1 * | 12/2002 | Swierczyna et al. | 126/299 R |
| 2003/0155228 A1 * | 8/2003 | Mills et al. | 204/157.3 |
| 2004/0194777 A1 * | 10/2004 | Antoniello | 126/299 R |
| 2005/0000199 A1 * | 1/2005 | Carter | 55/442 |
| 2005/0000509 A1 * | 1/2005 | Carter | 126/299 D |
| 2005/0022482 A1 * | 2/2005 | Bockle et al. | 55/321 |
| 2005/0028498 A1 * | 2/2005 | Entezarian et al. | 55/320 |
| 2005/0087069 A1 * | 4/2005 | Entezarian et al. | 95/272 |
| 2006/0076007 A1 * | 4/2006 | Luddy et al. | 126/299 D |
| 2006/0157048 A1 * | 7/2006 | Heilman | 126/299 R |
| 2007/0056578 A1 * | 3/2007 | Aviles | 126/299 D |
| 2007/0163216 A1 * | 7/2007 | Smasal et al. | 55/446 |
| 2007/0204854 A1 * | 9/2007 | Morton | 126/299 D |
| 2007/0272230 A9 * | 11/2007 | Meredith et al. | 126/299 R |
| 2008/0135042 A1 * | 6/2008 | Negandhi et al. | 126/299 D |
| 2008/0202083 A1 * | 8/2008 | Graham et al. | 55/444 |
| 2009/0032011 A1 * | 2/2009 | Livchak et al. | 126/299 D |
| 2009/0194093 A1 * | 8/2009 | Aviles | 126/299 E |

* cited by examiner

IMPACT FILTER WITH GREASE TRAP

CROSS-REFERENCE TO RELATED APPLICATIONS

The present regular U.S. patent application claims the benefits of U.S. Provisional Application Ser. No. 60/857,961 filed on Nov. 10, 2006.

FIELD OF THE INVENTION

The present invention relates generally to filters and screens for removing grease and other contaminants from an air stream, and more particularly, the invention pertains to filters for kitchen exhaust hoods used over cooking appliances.

BACKGROUND OF THE INVENTION

It is known to provide exhaust hoods above cooking areas to remove smoke, steam and odors from kitchens. The high temperature air exhausted from a cooking area can be laden heavily with grease and other contaminants. It is desirable to remove the grease and other contaminants before the air is released into the atmosphere so that clean air is exhausted. Further, it is desirable to remove a substantial portion of such contaminants early in the exhaust system so that only a minimal amount of contaminants deposit on the ducting near the exhaust system entrance, hence requiring less frequent cleaning.

A variety of different filters, screens and contaminant removal devices are known for kitchen exhaust hoods. Known grease filters, screens and capturing structures include serpentine paths for collecting grease on the surfaces thereof, electrostatic precipitators for removing grease particles, stainless steel mesh for trapping the particles and ultraviolet scrubbers for oxidizing small grease particles. While these and other known grease removal structures have been used commonly, frequent cleaning is required, and the costs are high. In general, known structures are effective only for removing large particles (10 microns and larger), and do not work well for capturing small grease particles.

Impact classifiers, or impactors, are known and can be designed with relatively high specificity for classification of particles in air streams. In an impactor, an air stream is accelerated and directed at a surface. Inertia of particles heavier than air carries the particles against or close to an impact surface. However, the air stream having negligible inertia turns more quickly. The particles of greater mass deviate from the air stream and hit the impact surface. The influence of the surface on the deflection path that each particle follows depends on the mass of the particle. Nozzle size, air velocity, the distance from the nozzle outlet to the impact plate and other dimensional characteristics can be used to alter the performance of the device. A known formula applying the Stokes number can be used to calculate the nozzle characteristics required to collect or remove particles above and at a specific mass. If the particles being processed are of substantially similar densities, the separation becomes one related to size of the particles. This specific particle size is known as the cut off size for the performance of the impactor. Ideally, particles of the cut off size and larger are removed efficiently from the air stream, and particles smaller than the cut off size are carried through the impactor by the air stream. Generally, smaller particles can be separated by decreasing the nozzle size and increasing the air stream velocity.

While known for use in classifying relatively solid particles, wherein a supply of the particles is processed through the impactor, impactors are not known to be used as filters, for removing contaminants from air streams. Applying impactor concepts to the collection of sticky substances such as grease and cooking residues in a substantially continuous process requires also substantially continuous removal of the contaminants collected by the filter to prevent re-entrainment of the particles in the exiting air stream, or at least isolation of the collected contaminants from the exiting air stream.

SUMMARY OF THE INVENTION

The present invention applies the concepts of impactor technology to the collection and removal of sticky substances, such as grease and cooking residues commonly found in kitchen exhaust streams, and provides a system and process for efficiently removing even small particles from an air stream.

Other features and advantages of the invention will become apparent to those skilled in the art upon review of the following detailed description, claims and drawings in which like numerals are used to designate like features.

Figure 1:
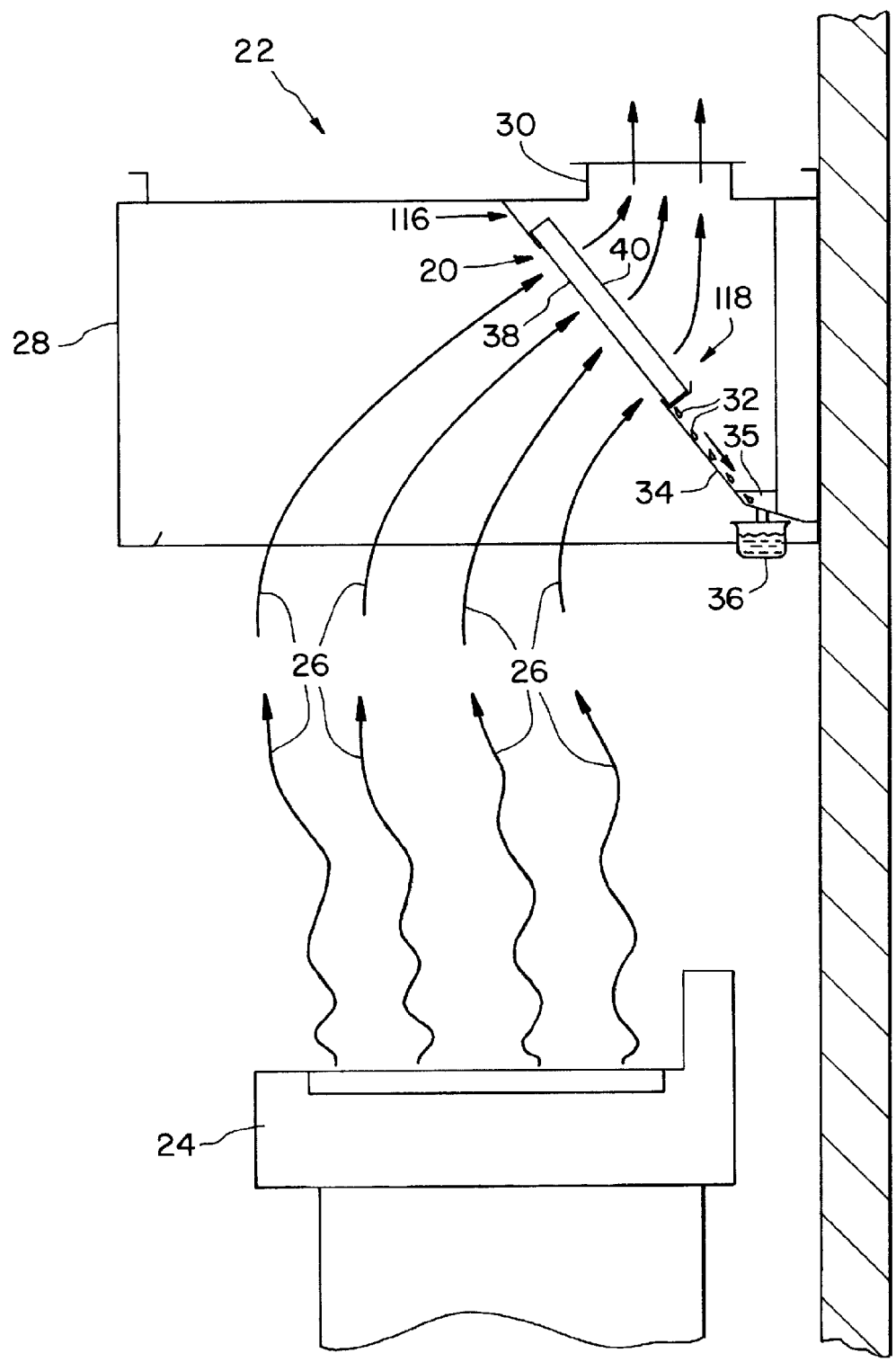
FIG. 1 is illustrates a cooking station having an impact filter with a grease trap in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now to the drawings more specifically, and particularly to FIG. 1, an impact filter 20 in accordance with the present invention is shown. Impact filter 20 can be used in an exhaust air cleaning system 22 above a cooking appliance 24, such as a stove, cook top, griddle or other appliance, which produces hot air, steam, grease-laden cooking vapors, combustion products, and solid and liquid vapors and particulates of various types and compositions, all indicted by arrows 26. Filter 20 is installed at an angle in an air-confining pathway, such as a hood or plenum 28 in flow communication with a duct 30. Grease 32 collected by filter 20 flows from filter 20 along a chute 34 to a collection gutter 35 extending substantially normal to the flow direction of grease 32 from filter 20 over chute 34. Gutter 35 is angled from one end thereof to an opposite end thereof to empty into a drain or cup 36 which can drain automatically or continuously, or can be emptied manually. Filter 20 can empty directly into gutter 35, without chute 34 therebetween, or chute 34 can be formed as an extending flange of gutter 35.

Impact filter 20 has an entrance side 38 and an exit side 40. Air contaminated with grease or other particles enters impact filter 20 through entrance side 38 and exits impact filter 20 from exit side 40. Contaminants in the air stream that are of a cutoff size or larger are removed from the air stream as it flows through filter 20.

Figure 2:
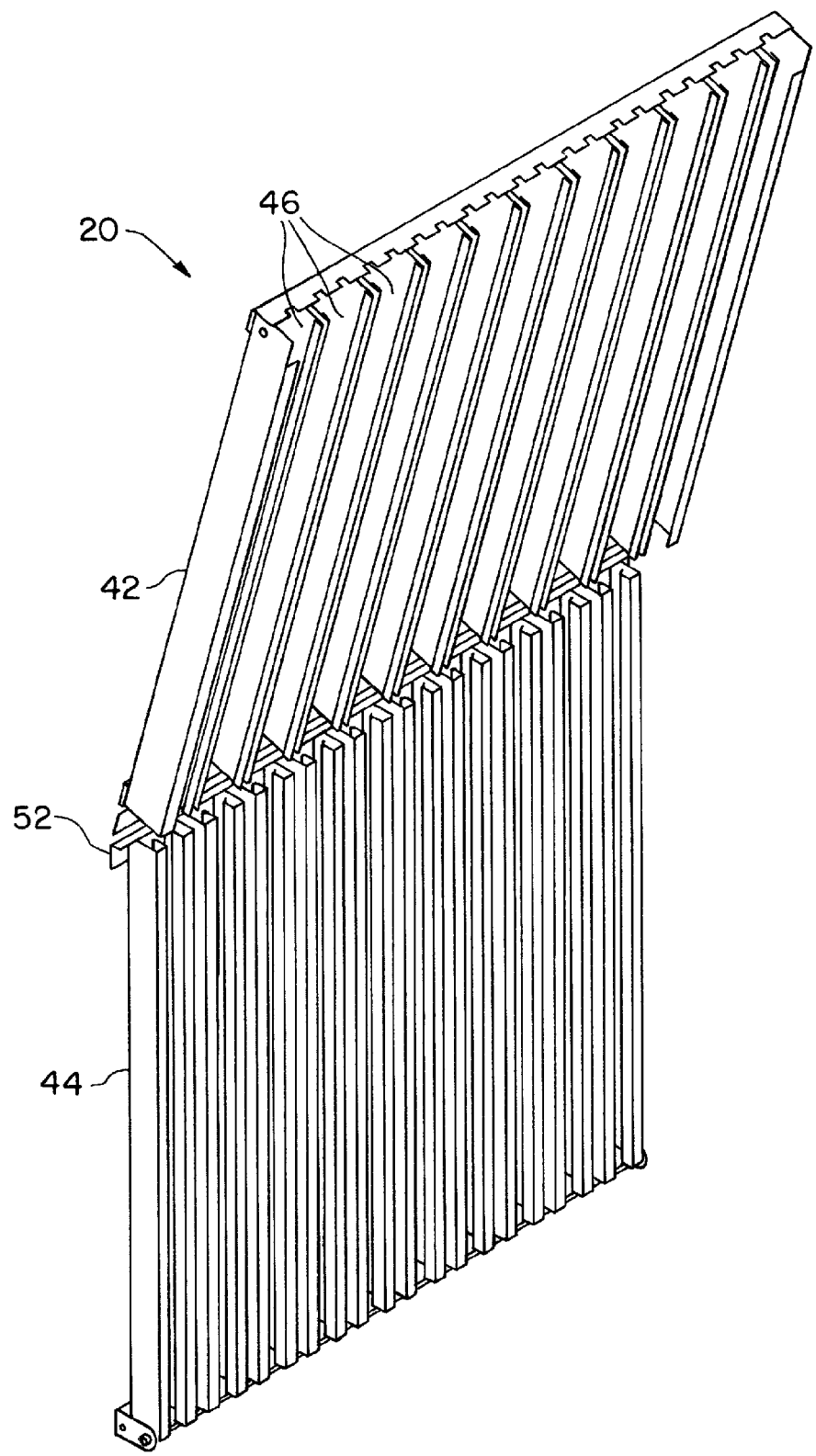
FIG. 2 is a perspective view of the impact filter shown in FIG. 1, showing the filter in an opened condition.
Figure 3:
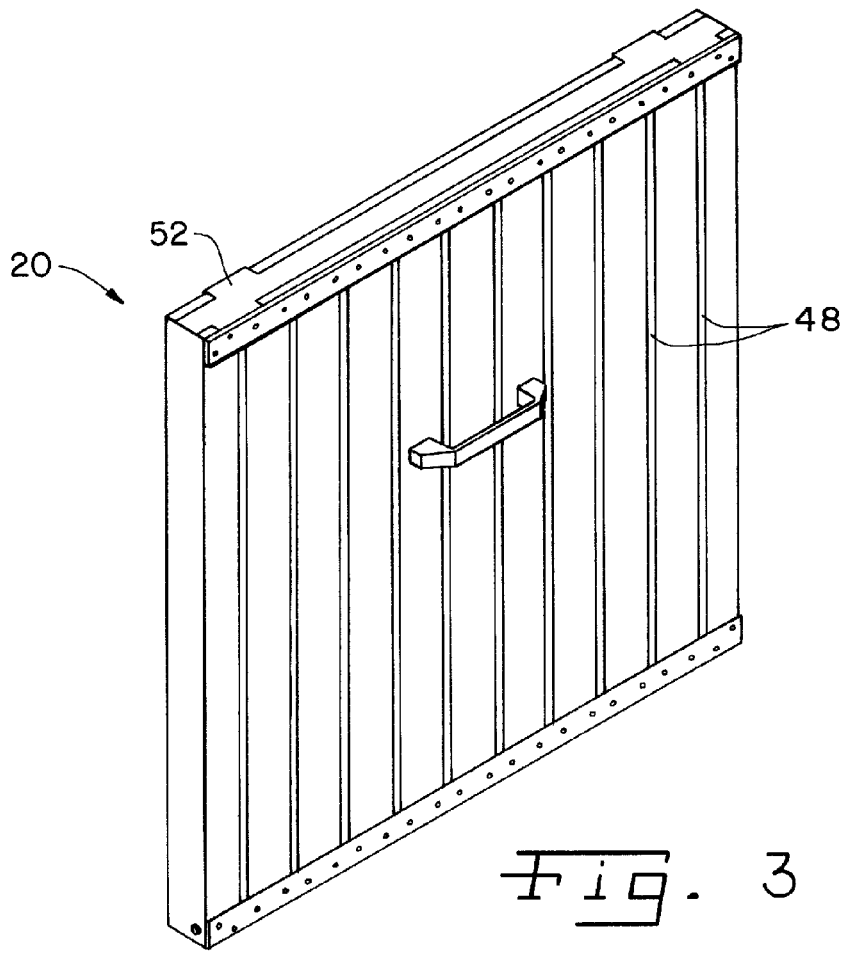
FIG. 3 is a perspective view of the impact filter shown in FIGS. 1 and 2, with the filter being closed.
Figure 4:
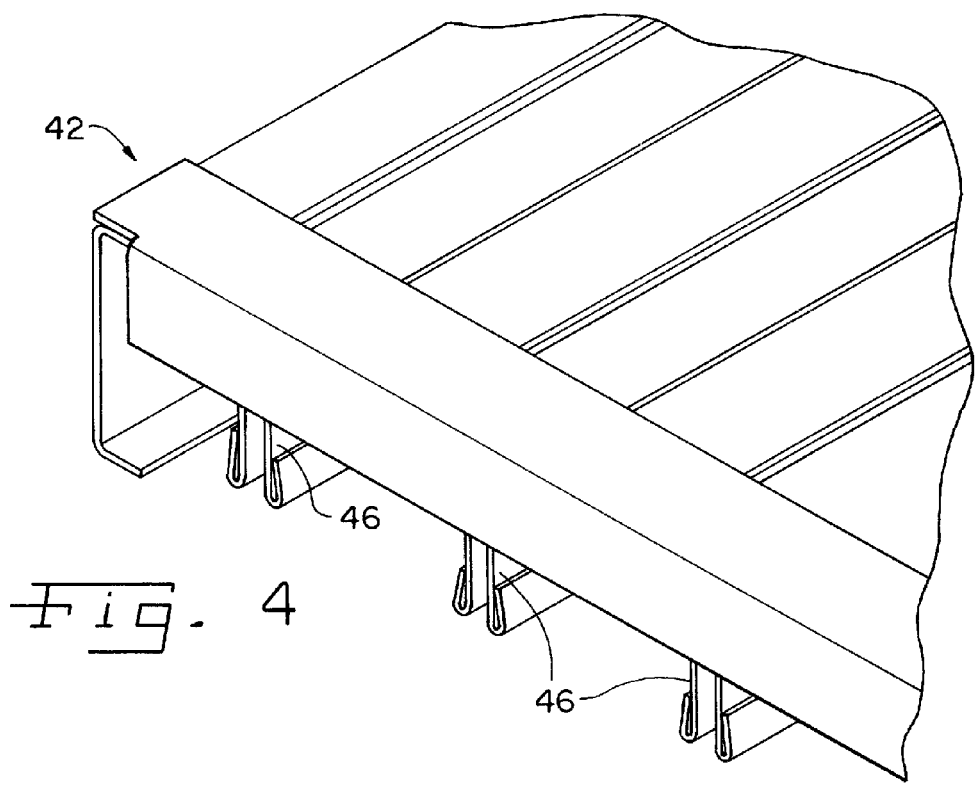
FIG. 4 is an enlarged, fragmentary view of one part of the impact filter.
Figure 5:
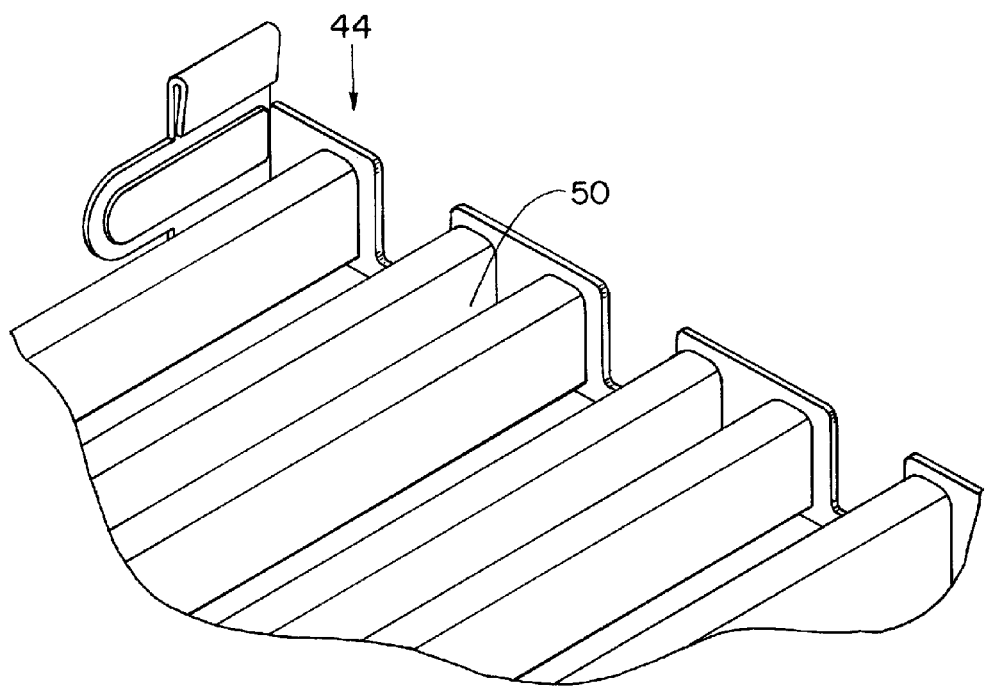
FIG. 5 is an enlarged, fragmentary view of another part of the impact filter.
Figure 6:
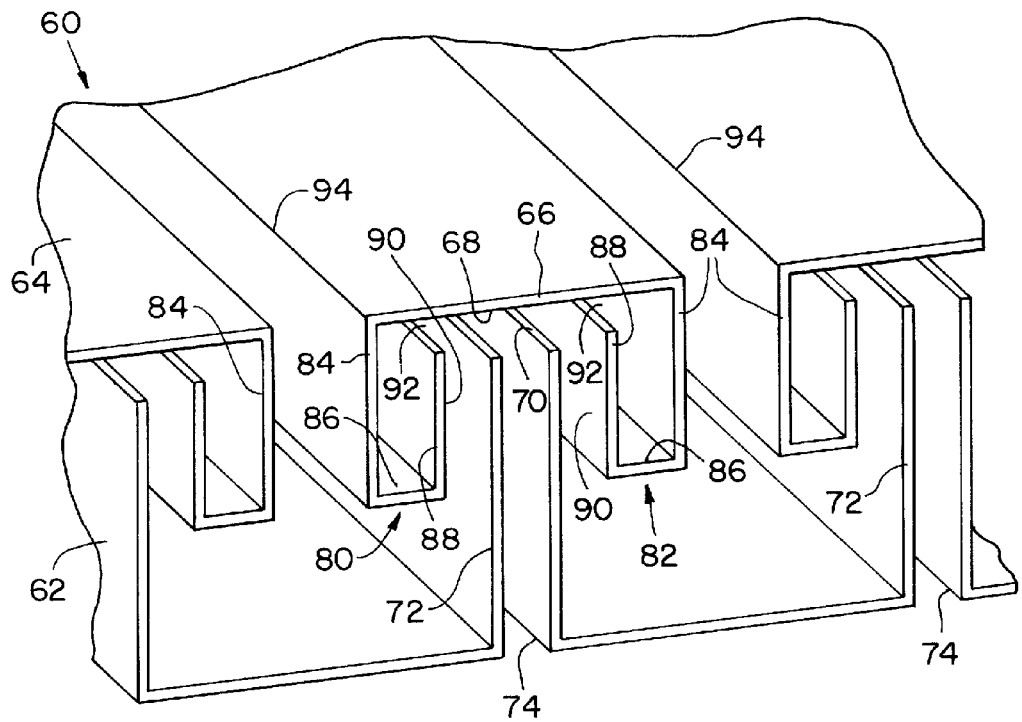
FIG. 6 is a fragmentary view of an end of a simplified impact filter in accordance with the present invention.

In the exemplary embodiment depicted in FIGS. 2-5, impact filter 20 includes an entrance panel 42 and an outlet panel 44 overlying and associated one with another to define an indirect path for a fluid, such as an air stream flowing through filter 20 from a nozzle 46 having a nozzle inlet 48 formed in entrance panel 42 to an outlet or exit orifice 50 defined in outlet panel 44. In the exemplary embodiment, nozzle 46 and exit orifice 50 are elongated slots, but can be of other shapes as well, including, for example, oval or rectangular. The exemplary embodiment is made such that panels 42 and 44 can be positioned one in the other to form the desired nested or interdigitated arrangement, and are connected one and to the other by one or more hinge 52 along edges of panels 42, 44. FIGS. 4 and 5 illustrate portions of discrete entrance and outlet panels 42, 44 described previously, and need not be connected by a hinge 52. It should be understood that other arrangements are possible also. If constructed of two or more panels or component parts, whether hinged or not, a filter of the present invention can be opened for easy internal cleaning With reference now to the simplified illustration shown in FIG. 6, the basic features and performance of filters of the present invention will be described. Simplified filter 60 includes an entrance panel 62 and an outlet panel 64. An impact plate 66 has an impact surface 68 confronting but spaced from a nozzle outlet 70 of a nozzle 72. Impact plate 66 extends laterally outwardly beyond nozzle outlet 70 on opposite sides thereof. A fluid, such as an air stream entering impact filter 60, is accelerated in nozzle 72. In the exemplary embodiment, nozzle 72 is an elongated path of sufficient length from a nozzle inlet 74 to nozzle outlet 70 so that the air and contaminants entrained in the air are accelerated to substantially similar velocities.

Further, in simplified filter 60, nozzle inlet 74, nozzle 72 extending therefrom and nozzle outlet 70 are elongated openings in the nature of a long slot. However, other shapes can be used. Instead of a long slot, nozzles can be provided as a series of smaller openings through entrance panel 62.

First and second troughs or grease traps 80 and 82, respectively, are provided along opposite sides of nozzle 72, in spaced relation thereto. While referred to herein as "grease traps", it should be understood that the trough-like structures as described hereinafter can be used for collecting other contaminants besides grease particles in a kitchen environment. Grease traps 80, 82 are trough-like structures each having a collector wall 84 substantially contiguous with and at substantial right angles to impact plate 66. Collector wall 84 extends from impact surface 68 to a trough bottom 86. Trough bottom 86 extends from collector wall 84 toward nozzle 72, substantially parallel to impact surface 68. A baffle 88 in the nature of a substantially straight wall extends from trough bottom 86 toward impact surface 68, in spaced relation to nozzle 72. A baffle surface 90 faces nozzle 72. Baffle 88 terminates a distance from impact surface 68, thereby defining a trough entrance 92 between baffle 88 and impact surface 68. Except for the opening defined by entrance 92, the trough or trap is substantially closed to flow from nozzle 72. However, at least one end of each trough or trap is open so that contaminants collected in the troughs or traps can be drained from the filter.

Outlet panel 64 defines a plurality of filter exit orifices 94, from which the air stream leaves filter 60. In the exemplary embodiment, exit orifices 94 are elongated slot-like openings defined between outer surfaces of adjacent collector walls 84 associated with different entrance nozzles 72.

An impact filter of the present invention uses differential inertia between air and particles entrained in an air stream to extract and collect the particles from the air stream. Since particles such as grease, char particles, water, dust and the like have densities higher than the density of air; even relatively small particles have sufficiently greater inertia when accelerated by an air stream to be separated by the impact filter. If both the particles and air are emitted from a nozzle at substantially similar velocities against a plate confronting the nozzle, the air turns sharply in front of the plate. However, particles with greater inertia deviate from the path of the air stream and impact the plate or approach the plate more closely. For each impact filter, the nozzle size, nozzle to plate distance and air stream velocity are relevant to the performance of the filter.

It is known from particle physics that in the handling, treatment and separation of aerosols, variables such as the nozzle diameter and fluid velocity from the nozzle, the fluid viscosity and particle density can be selected to determine the captured particle size in an impactor. If the particles being handled in the impactor are of substantially the same material, or otherwise have similar density, size becomes the determining factor, and a so-called particle "cut off size" exists for performance of the impactor. The "cut off size" specifies a particle size for any given impactor such that particles of the "cut off size" and larger are removed efficiently in the impactor, and particles smaller than the "cut off size" are carried on with the air stream. The formula for calculating the cutoff size relates to the Stokes Number, air viscosity, nozzle diameter (or nozzle width for rectangular nozzles), particle density, slip correction factor ($C_c$) and the nozzle velocity. According to the formula:

$$\text{Cutoff particle size} = \left[\frac{9(\text{air viscosity})(\text{nozzle diameter})(\text{Stokes Number})}{(\text{particle density})(\text{nozzle velocity})(C_c)}\right]^{1/2}$$

The above understanding is applied to the operation and performance of impact filters of the present invention. Grease particle contaminants in kitchen exhaust air have similar densities, and the above formula can be used to determine a grease particle cutoff size for impact filters of the present invention. Other particles of mass similar to the mass of the cutoff size grease particle will be removed also. For removing grease particles from an air stream in a kitchen exhaust hood, the distance between nozzle outlet 70 and impact surface 68 can be between about one half to ten times the nozzle diameter. Nozzle diameters of from about 0.005" to about 0.5" are believed to be suitable and can be square, rectangular, round, triangular or the like. Acceptable performance for collecting small grease particles has been found if the distance from the nozzle outlet to the impact surface is approximately one half the width of the nozzle. Accordingly, if a nozzle width of 0.02 inch is used, a nozzle to impact surface distance of 0.01 inch is effective for removing particles of grease, with a nozzle to baffle surface distance also of about 0.01 inch.

The gap defined as trough entrance 92 also can affect the particle size collected in the filter. For example, it was found that a trough opening or entrance 92 larger than the distance between nozzle outlet 70 and impact surface 68 collected smaller grease particles than if the opening was the same as the distance between nozzle outlet 70 and impact surface 68.

In the use of the present invention, an air stream has entrained therein a first set of particles of the cut off size or larger (assuming particles of similar density) and a second set of particles smaller than the cut off size. The first and second sets of particles are randomly dispersed in the air stream. The air stream and particles are accelerated in nozzle 72 and are directed at impact surface 68. As the air stream and particles leave nozzle outlet 70, an initial division occurs into two major paths, with some of the air flow and some of the particles flowing away from nozzle outlet 70 toward trap 80 and some of the air flow and some of the particles flowing toward trap 82.

In each of the two major paths, one toward first trap 80 and one toward second trap 82, the particles are diverted by impact surface 68 and are separated into two primary groups. Heavier particles with greater inertia are carried to and impact surface 68 or are diverted in close proximity to surface 68. Lighter particles with less inertia and the air are diverted more sharply out of nozzle 72, a greater distance from surface 68 without impacting surface 68. Accordingly, the first group of particles flows in a current close to or against impact surface 68 and includes substantially only particles from the first set of particles. These particles can accumulate as a layer on impact surface 68. The second group of particles includes substantially only particles from the second set of particles, which flow in currents more distant from impact surface 68. As the currents curve downwardly away from impact surface 68, the first group of particles enters trough entrance 92, being held against or near and urged along surface 68 at least in part by the air stream flowing thereagainst. Baffle 88 provides a separating barrier between the currents carrying the first group of particles and the currents carrying the second group of particles. Further, a substantial portion of the air flow is outward of traps 80, 82 so that little airflow actually enters traps 80, 82, but the heavier particles are urged into traps 80, 82 by the air currents just outwardly thereof. Once inside traps 80, 82 the grease particles can flow along collector walls 84 to accumulate in trough bottoms 86 and drain therefrom through open ends of the traps due to the angular orientation of the filters. The grease remains in a substantially liquid state due to the heat commonly experienced in kitchen exhaust systems, and the grease therefore flows well through the traps in the filter as well as over chute 34, along gutter 35 and into cup or drain 36.

When an impact filter is used for removing grease or other sticky particles, the particles cling to or are held against the impact surface and other surfaces, including on collector wall 84 and bottom 86. An air stream approaching impact surface 68 turns quickly and is redirected along impact surface 68. Without baffle 88, the air stream redirected by impact surface 68 can enter the area between impact surface 68 and bottom 86. When the air stream is again redirected by collector wall 84, a sweeping or scouring action is performed along wall 84 and bottom 86, and particles initially removed and separated from the air stream clinging to collector wall 84 or bottom 86 can become re-entrained in the air stream. The re-entrained particles can then be carried out of the filter, decreasing removal efficiency. Baffle 88 restricts such re-entrainment of previously separated particles by redirecting the air stream before the air stream enters the area between impact surface 68 and a bottom 86.

In a system 100 shown in FIG. 7, a filter 102 of the present invention is used with a second filter 104 of the present invention operating in series in a hood 106. Filter 104 can be substantially identical to filter 102 or, in a preferred arrangement, is configured so as to remove particles smaller than those removed in filter 102. Accordingly, large particles that may otherwise clog or foul openings such as the nozzle inlets and nozzle outlets in second filter 104 are first removed by filter 102, and mostly only smaller particles are presented for removal in filter 104.

An airflow designated by arrows 108 is induced in hood 106 and a duct 110 by an air mover such as an exhaust fan 112. Further scrubbing or cleaning of airflow 108 is performed by a secondary cleaning unit depicted generally by the box designated by numeral 114, which includes one or more secondary cleaning device such as an ultraviolet light, an electrostatic precipitator, an additional impact filter, or other contaminant removal device known to those skilled in the art. With the indirect or serpentine path between nozzles and outlet orifices as described previously herein, light from a UV light cleaning device is blocked upstream of filters 102, 104. If filters 102, 104 are constructed of side-by-side modular components, overlapping plates can be provided between adjoining components to provide UV blocking upstream of the filter. Secondary cleaning unit 114 can be used in addition to or in place of second impact filter 104.

To assist contaminant handling and grease runoff, filter 20 (FIG. 1), and filters 102, 104 (FIG. 7) can be arranged with an elevation at a first side 116 thereof at a higher elevation than a second side 118 thereof, with grease traps 80, 82 in the filters extending from first side 116 to second side 118.

Accordingly, grease flows in troughs or traps 80, 82 from one end thereof to an opposite end thereof, toward downwardly extending chute 34 (FIG. 1). As previously described, gutter 35 also can be angled from one end thereof toward the other end thereof to promote draining toward cup 36 for further handling and disposal of the grease.

A wash system including one or more wash nozzle 120 can be provided in system 100 for cleaning filters 102, 104 and hood 106. Nozzles 120 can be positioned and directed as necessary, including on the inlet sides of filters 102, 104 to provide cleaning solution that can be drawn through filters 102, 104 to clean the interiors thereof. Wash functions can be performed intermittently on demand or automatically.

Figure 8:
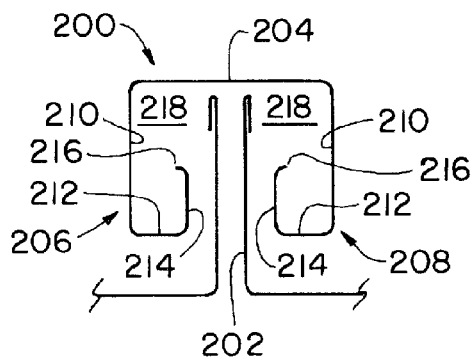
FIG. 8 is a schematic illustration of another embodiment of the present invention.
Figure 9:
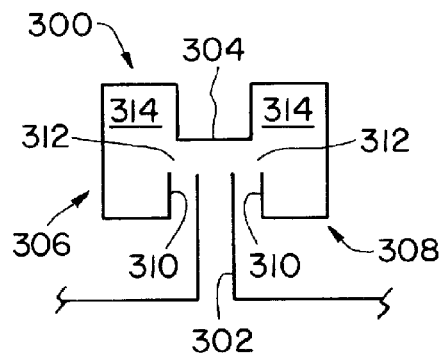
FIG. 9 is a schematic illustration of still another embodiment of the present invention.

FIGS. 8-13 illustrate schematically some additional features and embodiments of the present invention. In FIG. 8, impact filter 200 includes a nozzle 202 and an impact plate 204. First and second troughs or traps 206, 208 are provided on opposite sides of nozzle 202. A collecting wall 210, trough bottom 212 and baffle 214 are provided in each trough or trap 206, 208. Baffles 214 have inwardly directed lips 216 along edges of the baffles at entrances 218. Light weight contaminants directed as currents into troughs or traps 206 and 208 can swirl, potentially swirling out of the trough or trap and being captured by the main air stream flowing past baffle 214. Lips 216 retain at least an outer layer of any swirling light weight contaminants, further improving removal efficiency of filter 200.

FIGS. 9-12 illustrate different shapes for troughs or traps of the present invention. An impact filter 300 shown in FIG. 9 includes a nozzle 302 and an impact plate 304. First and second troughs or traps 306, 308 are provided on opposite sides of nozzle 302, each including a baffle 310 defining an entrance 312 between the end of the baffle and impact plate 304. Portions of troughs or traps 306 and 308 extend behind impact plate 304, forming recessed areas 314.

Figure 10:
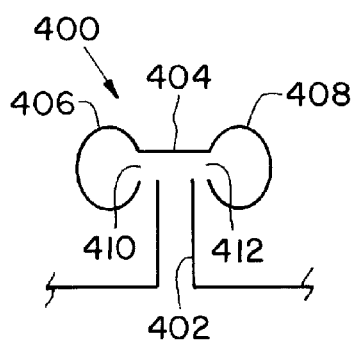
FIG. 10 is a schematic illustration of yet another embodiment of the present invention.

Impact filter 400 shown in FIG. 10 includes a nozzle 402 and an impact plate 404. First and second troughs or traps 406, 408 are rounded, continuously curved bodies, generally oval shaped and having narrow entrances 410, 412, respectively.

Figure 11:
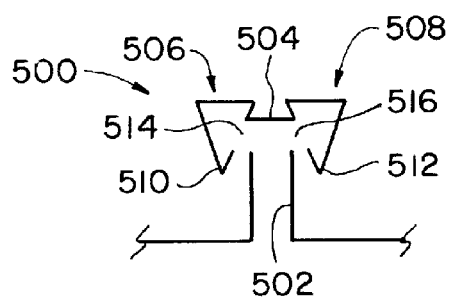
FIG. 11 is a schematic illustration of a further embodiment of the present invention.

Impact filter 500 shown in FIG. 11, includes a nozzle 502 and an impact plate 504. First and second troughs or traps 506, 508 are triangularly shaped and have tapered, pointed trough bottoms 510, 512, respectively. Entrances 514, 516 are formed along one side of the triangularly shaped troughs or traps 506, 508

Figure 12:
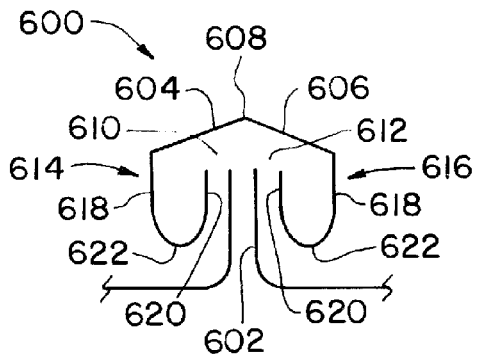
FIG. 12 is a schematic illustration of a still further embodiment of the present invention.

Impact filter 600 shown in FIG. 12 includes a nozzle 602. Instead of a single, flat impact plate, filter 600 includes impact plate segments 604, 606 that meet at an apex 608 and angle toward entrance openings 610, 612 of first and second troughs or traps 614, 616. Troughs or traps 614, 616 each include a collecting wall 618 and baffle 620, with a rounded trough bottom 622 between collecting wall 618 and baffle 620.

Figure 13:
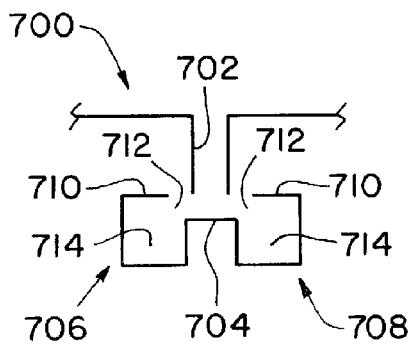
FIG. 13 is a schematic illustration of another embodiment of the present invention.

It should be understood also that impact filters of the present invention need not be oriented vertically or horizontally. Since flow therethrough is induced, velocity in the air stream and contaminants can be controlled regardless of the orientation of the filter. FIG. 13 illustrates an embodiment of an impact filter 700 similar to filter 300 in FIG. 9, but having a nozzle 702 located above an impact plate 704. First and second troughs or traps 706, 708 are provided on opposite sides of nozzle 702, each including a baffle 710 defining an entrance 712 between the end of the baffle and impact plate 704. Portions of troughs or traps 706 and 708 extend behind impact plate 704, forming recessed areas 714.

The various alternative features and structures for the present invention shown and described with respect to FIGS. 8-13 are merely exemplary and not exhaustive of the variations contemplated by the invention. Further, the various different features and structures can be used in alternative combinations. For example and not limitation, the generally rounded trough bottoms shown for filter 400 and filter 600 can be used for impact filters generally configured as shown for filter 300 or filter 700. As yet a further example, the various shaped troughs or traps can include inwardly directed lips such as lips 216 shown in FIG. 8.

Figure 14:
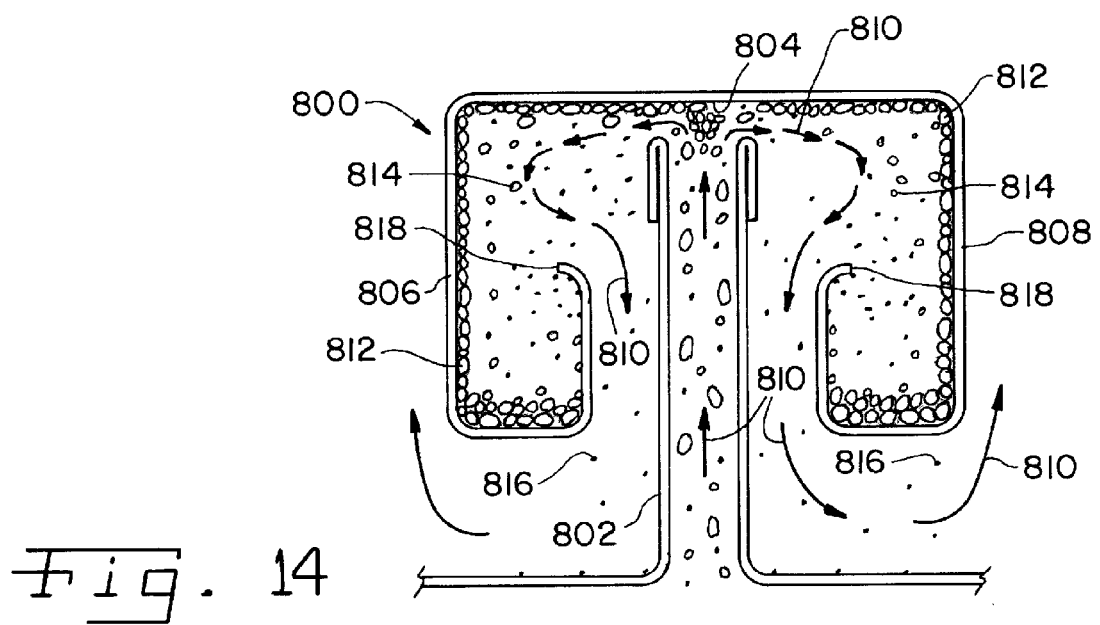
FIG. 14 is a schematic illustration of particle separation in filters of the present invention.

When used for the collection of grease particles or other contaminants having adhesive qualities, the contaminant will cling to surfaces of the traps of the present invention. Further, the force of air flowing through the filter assists in holding the contaminants against the surfaces. However, surfaces with specialized coatings also can be used to improve the manner in which the collected contaminant particles cling to and follow the surfaces. FIG. 14 depicts a filter 800 having a nozzle 802 confronted by an impact surface 804. First and second troughs or traps 806, 808 are provided on opposite sides of nozzle 802. An air stream 810 has particles randomly dispersed therein, including large particles 812, medium particles 814 and small particles 816. Larger particles 812 have impacted impact surface 804 and have formed a layer of grease thereon. As illustrated in FIG. 14 a ridge of accumulated particles forms centrally of nozzle 802, in a somewhat stilled zone where air stream 810 splits into separate flows toward first and second troughs or traps 806 and 808. Medium particles 814, being moderately smaller than large particles 812 but larger than small particles 816 follow closely to impact surface 804 but might not contact surface 804 as larger particles 812 do. However, medium particles 814 follow close enough to surface 804 to enter and be caught in troughs or traps 806, 808. Air currents assist in holding large particles 812 and medium particles 814 against or near impact surface 804 to be captured in troughs or traps 806, 808. Small particles 816, being smaller than the cutoff size, flow along with air stream 800 and exit filter 800. Some small particles 816 can be carried into troughs or traps 806, 808 and circulate therein. Inwardly projecting lips 818 capture some of the circulating small particles 816, retaining them in the troughs or traps.

Figure 15:
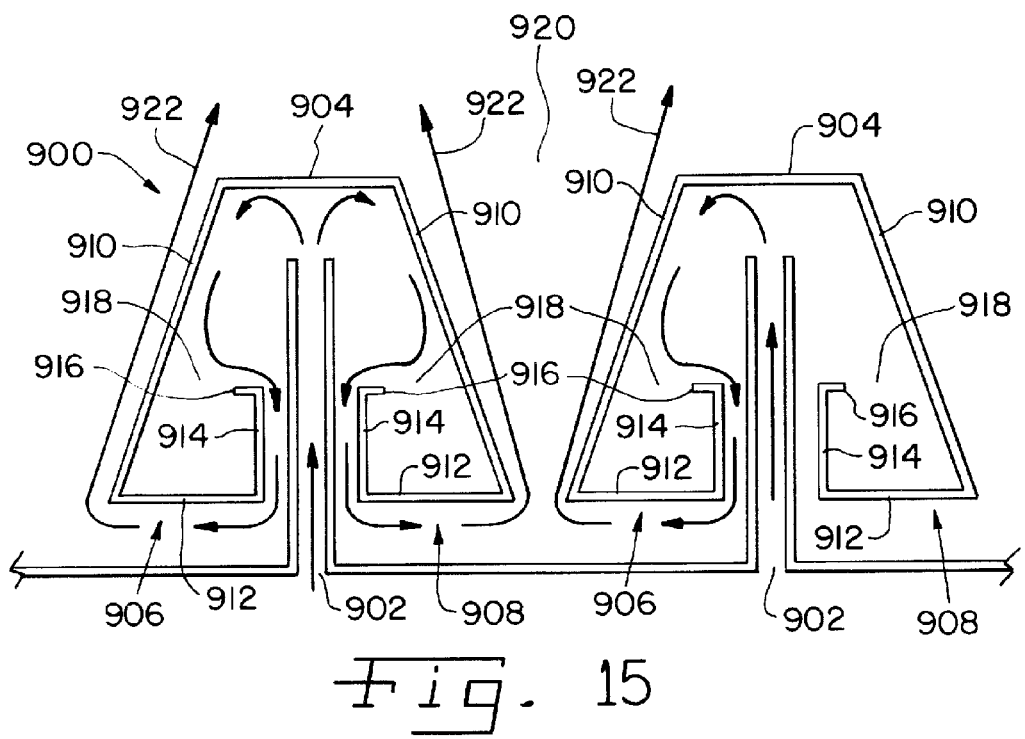
FIG. 15 is a schematic illustration of an impact filter of the present invention having reduced outlet velocity.

In FIG. 15, an impact filter 900 includes nozzles 902 and impact plates 904. First and second troughs or traps 906, 908 are provided on opposite sides of each nozzle 902. A collecting wall 910, trough bottom 912 and baffle 914 are provided in each trough or trap 906, 908. Baffles 914 have inwardly directed lips 916 at entrances 918. Light weight and smaller contaminants entering troughs or traps 906 and 908 can swirl, potentially swirling out of the trough or trap and being recaptured by the main air stream flowing past baffle 914. Lips 916 retain at least an outer layer of any swirling light weight contaminants, further improving removal efficiency of filter 900. Outlets 920 defined between two troughs or traps 906, 908 associated with different nozzles 902 are outwardly flared, to decrease the outlet velocity of an air stream 922 flowing from filter 900. Decreased outlet air velocity can be advantageous in reducing flame propagation in the event of a hood fire.

Figure 16:
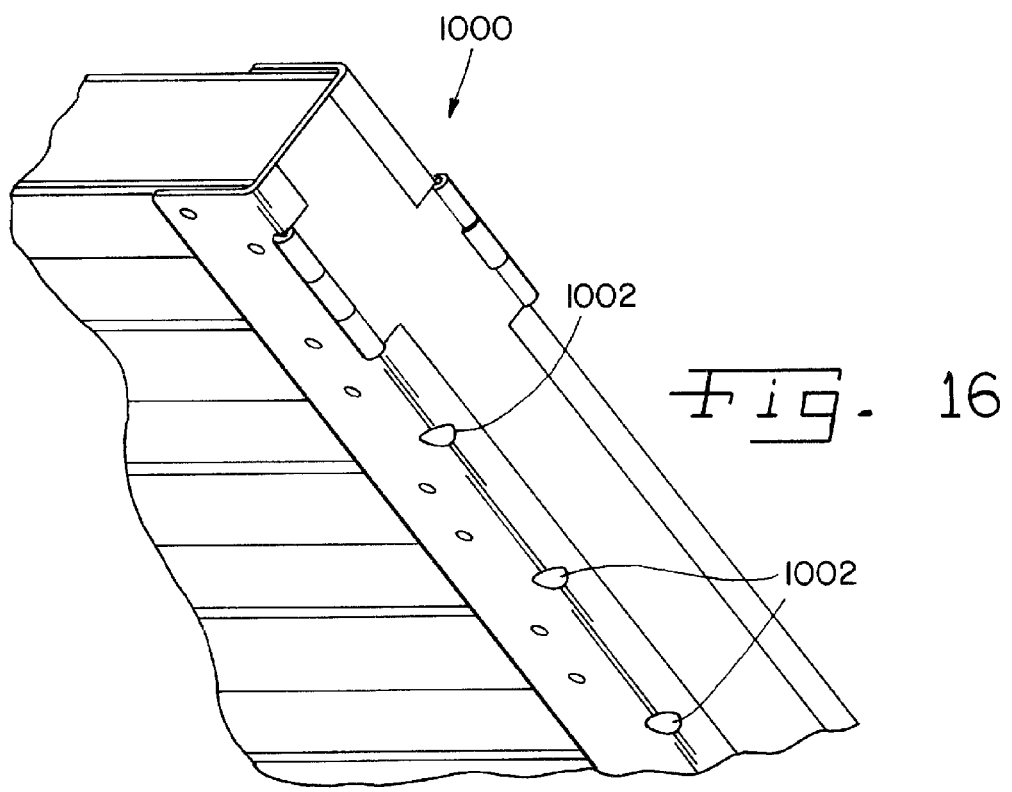
FIG. 16 is a fragmentary view of a filter of the present invention.

FIG. 16 is an enlarged, close-up view of a filter 1000 of the present invention similar to filter 20 shown in FIGS. 2 and 3.

Figure 23:
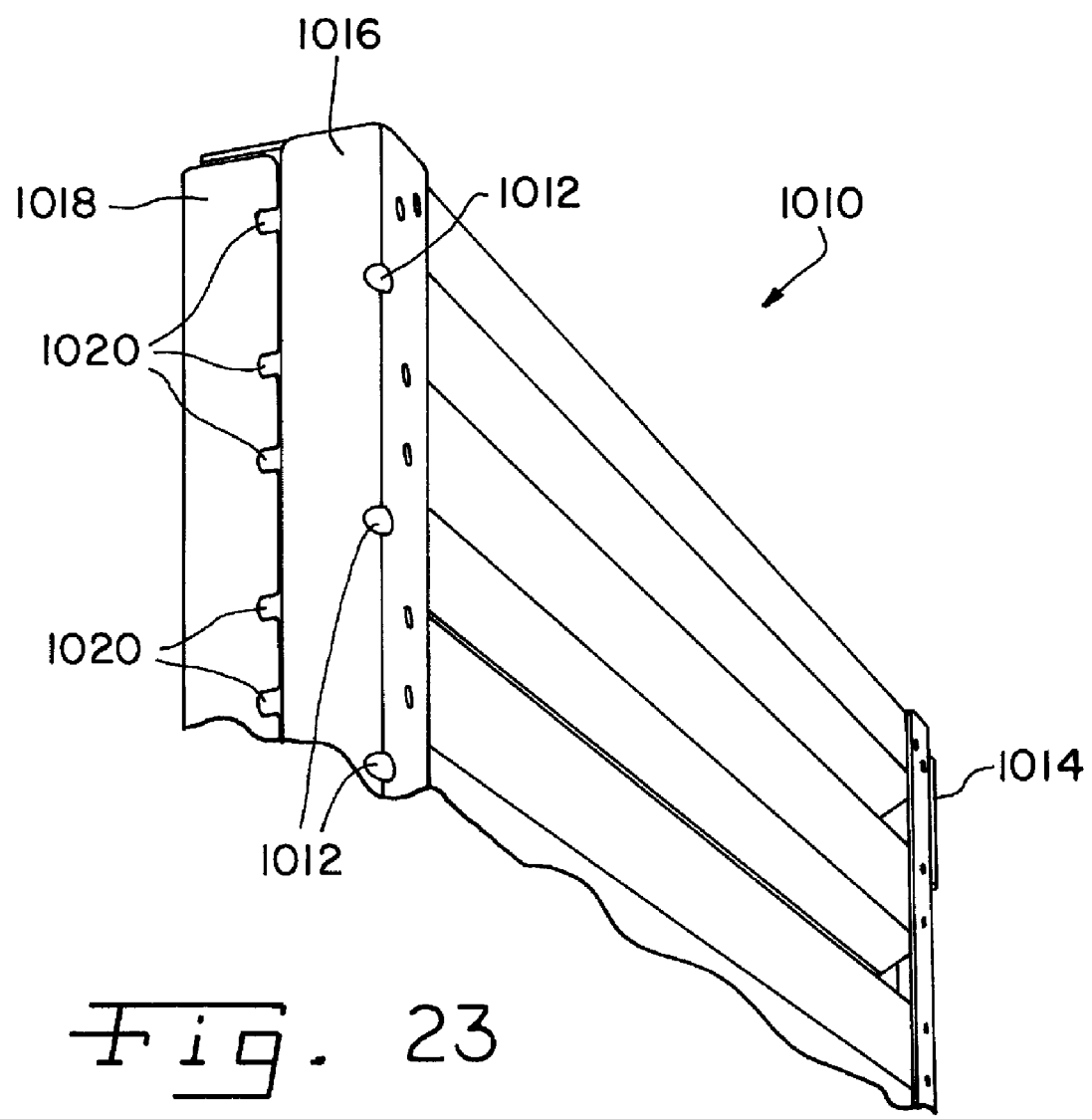
FIG. 23 is a fragmentary perspective view of another variation of the present invention.

In filter 1000, a series of drain holes 1002 can be seen. Drain holes 1002 provide an outlet path from filter 1000 for grease and other contaminants collected therein. It should be understood that drain holes 1002 can be provided along opposite edges of filter 1000 so that filter 1000 can be installed in various orientations up and down, yet still work effectively to drain the collected contaminants. FIG. 23 illustrates an embodiment of a filter 1010 in which drain holes 1012 are provided in a side of filter 1010 opposite a hinge 1014. A frame member 1016 in which drain holes 1012 are provided collects grease runoff from the filter under some conditions. FIG. 23 further illustrates a frame member 1018 having direct grease outlets 1020 aligned with grease troughs or traps within filter 1010.

Figure 17:
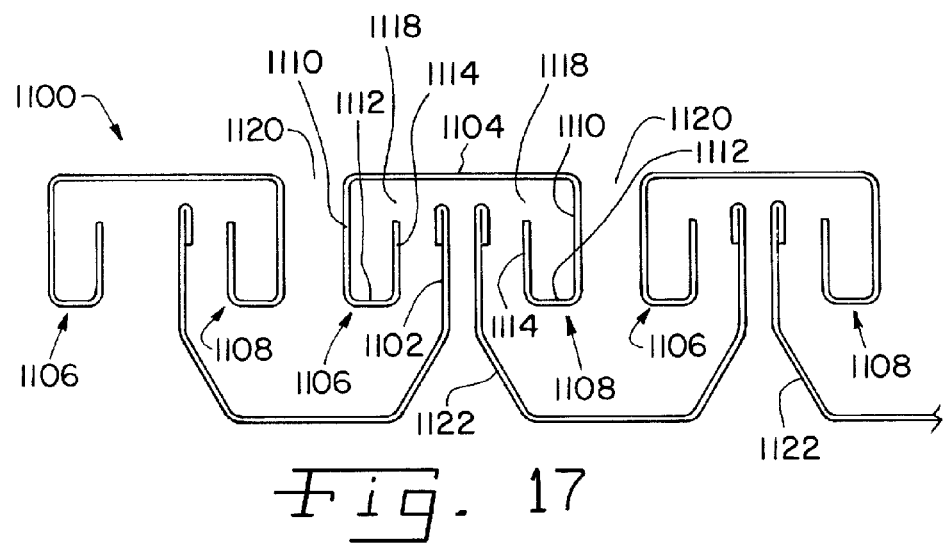
FIG. 17 is a schematic illustration of yet another embodiment of a filter in accordance with the present invention.

In FIG. 17, yet another embodiment of an impact filter 1100 in accordance with the present invention is shown. Filter 1100 includes a nozzle 1102 and an impact plate 1104. First and second troughs or traps 1106, 1108 are provided on opposite sides of nozzle 1102. A collecting wall 1110, trough bottom 1112 and baffle 1114 are provided in each trough or trap 1106, 1108. Each baffle 114 defines an entrance 1118 to a trough or trap. Outlets 1120 defined between two troughs or traps 1106, 1108 associated with different nozzles 1102 are provided. In filter 1100, a funnel-like entrance 1122 is provided for each nozzle 1102. Entrance 1122 has inwardly tapering sides in the direction of air flow to gather and direct air toward nozzle 1102. It is believed that entrance 1122 provides higher nozzle efficiency, decreasing the energy required to pull air through nozzle 1102. Air turbulence may be decreased, and pressure drop may be lessened.

Figure 18:
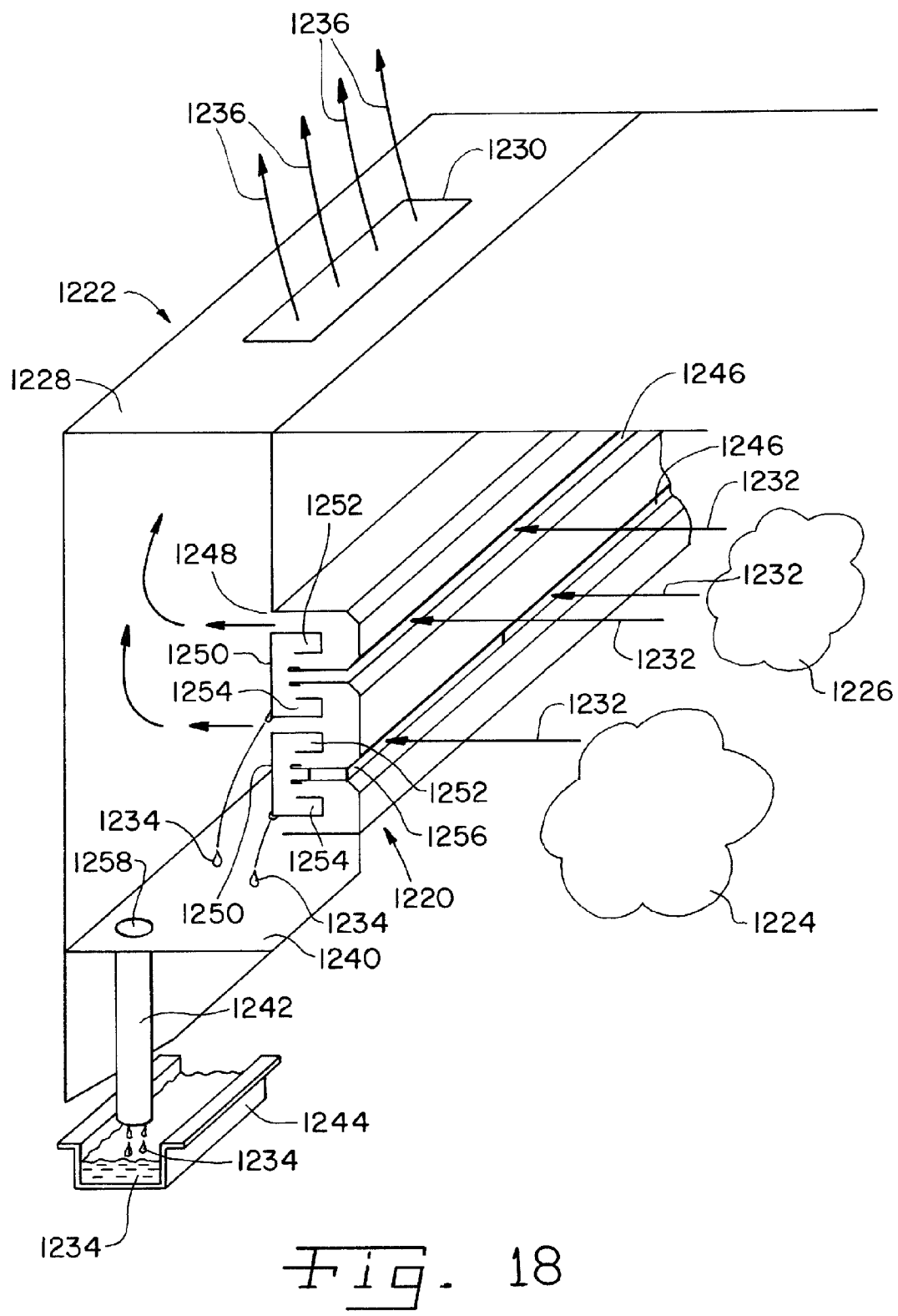
FIG. 18 is a schematic illustration of still another embodiment of the present invention.

FIG. 18 illustrates an impact filter 1220 of the present invention in an exhaust air cleaning system 1222 above and/or behind first and second cooking areas 1224 and 1226. Filter 1220 defines an entrance to a hood or plenum 1228 having an outlet 1230. Grease or other contaminants laden airflow, indicated by arrows 1232, enters impact filter 1220 wherein the grease and contaminants 1234 are removed to provide a cleaned air flow, indicated by arrows 1236, which flows through hood 1228 to be discharged at outlet 1230.

Grease and other contaminants 1234 removed in filter 1220 flow therefrom to a chute 1240 having a drain 1242 emptying into a collection gutter 1244. Other collecting means and structures can be used to gather and continuously dispose of the contaminants, or to gather and hold the contaminants for batch removal at selected times.

Filter 1220 is substantially horizontally disposed, having entrance nozzles 1246 above and/or behind cooking areas 1224 and 1226. Exit orifices 1248, also in the nature of elongated substantially horizontal slots, are provided on the opposite side of filter 1220 from nozzle inlets 1246. Each nozzle inlet 1246 is confronted by an impact plate 1250 and is flanked by first and second troughs or traps 1252, 1254. Filter 1220 operates in similar fashion to the embodiments described previously herein to separate and collect contaminants 1234 from airflow 1232, by isolating the contaminants in traps 1252, 1254 and draining the contaminants from the traps. Contaminants 1234 can accumulate on and follow along collecting walls of traps 1252, 1254, and may be drained therefrom without substantial accumulation at trough bottoms.

In some installations in some cooking environments, cooking areas 1224 and 1226 may generate substantially different amounts of grease laden vapor. For example, cooking area 1224 may be an oven, a toaster or other such device or area generating minimal contaminants, whereas cooking area 1226 may be a grill, char-broiler or the like generating substantially more contaminants. One or more plug 1256 is provided in a portion of one or more nozzle inlet 1246, to block or restrict air flow therethrough in the area of filter 1220 evacuating air from near cooking area 1224. Overall system efficiency is enhanced by processing lower volumes of lightly contaminated air from cooking areas generating less contaminants, and processing comparatively larger volumes of air from near cooking areas generating more contaminants. Duct and fan sizes can be reduced, to increase operating efficiencies as well as reduce installation costs when air volumes processed correspond to contaminant removal requirements.

While described herein as "substantially horizontal" it should be understood that filter 1220, chute 1240 and gutter 1244, as with the previously described embodiments, can be at moderate tilt or angular orientation from one side or end thereof to an opposite side or end thereof to promote efficient drainage of contaminants 1234. Accordingly, components in system 1222 are angled so as to provide one or more drain hole 1258 at a low point for the areas drained thereby, for efficient contaminant removal. Chute 1240 is angled toward drain 1242 for efficient contaminant removal, and gutter 1244 can be angled toward an outlet, or substantially level for batch collection of contaminants 1234.

Figure 19:
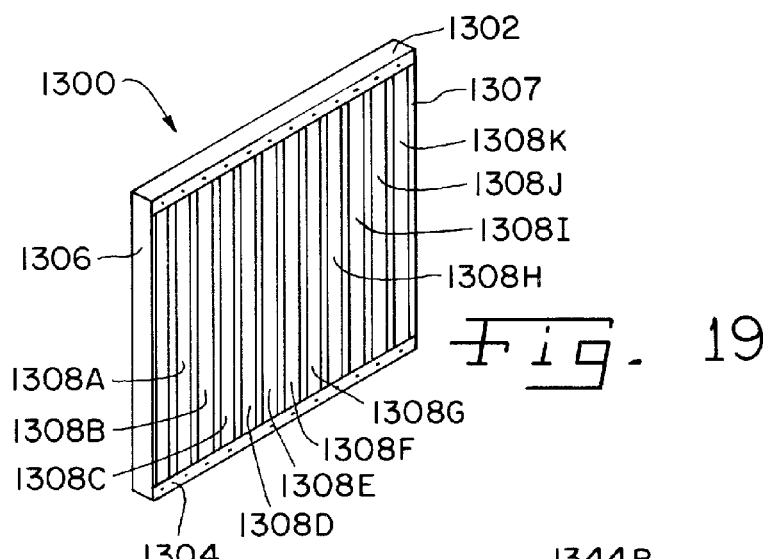
FIG. 19 is a perspective view of still another embodiment of the present invention that is somewhat simplified in structure and suitable for economic manufacture.
Figure 20:
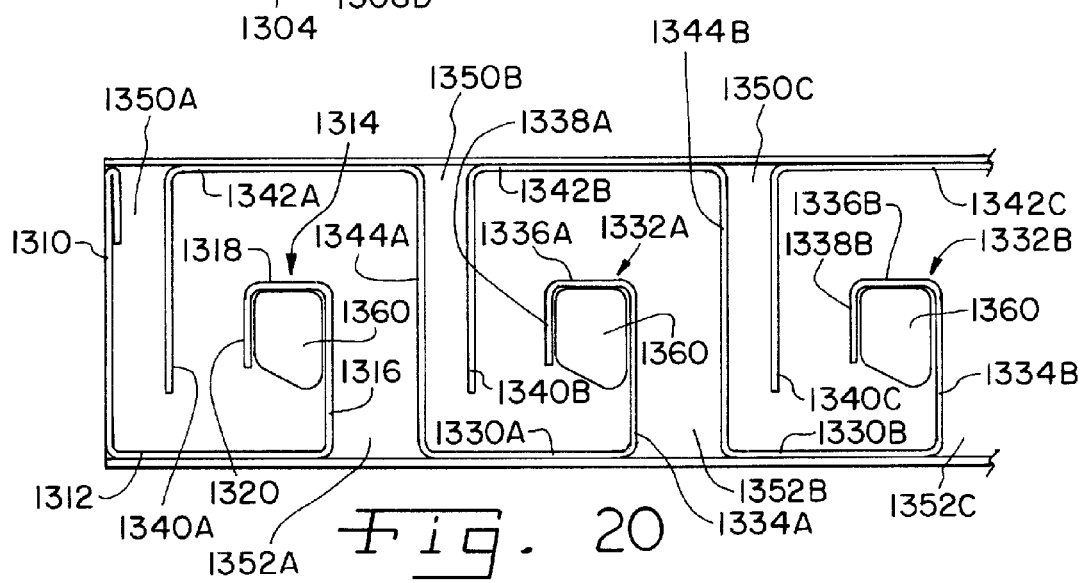
FIG. 20 is a fragmentary end view of an inner portion of the embodiment shown in FIG. 19.

FIGS. 19 and 20 illustrate an embodiment of an impact filter 1300 that is of a modular structure, and therefore easy and efficient to manufacture and assemble. Filter 1300 includes a top channel 1302, a bottom channel 1304, end modules 1306 and 1307 and a plurality of similar filter modules 1308A-K.

As can be seen more clearly in FIG. 20, end module 1306 includes an inlet panel 1310, and an impact plate 1312 substantially at right angle to inlet panel 1310. End module 1306 further defines a trough or grease trap 1314 including a collector wall 1316 substantially at right angle to impact plate 1312, a trough bottom 1318 and a baffle 1320. Trough or grease trap 1314 is similar to the others described herein, with baffle 1320 and impact plate 1312 defining a space therebetween.

Filter modules 1308 A-K are generally S-shaped in cross-section and include portions of adjacent filtering sites. Accordingly, as shown in FIG. 20, filter modules 1308A and 1308B include first portions configured similarly to the configuration described for end module 1306, including impact plates 1330A, 1330B, respectively; and troughs or traps 1332A, 1332B that include collector walls 1334A, 1334B substantially at right angle to impact plate 1330A, 1330B, respectively; trough bottoms 1336A, 1336B and baffles 1338A, 1338B, respectively. Second portions of filter modules 1308A, 1308B are generally U-shaped including inlet separator walls 1340A, 1340B; redirecting walls 1342A, 1342B and connecting walls 1344A, 1344B between the first and second portions of the filter module.

When assembled in a series, interleaved arrangement as shown in FIG. 20, inlet panel 1310 and inlet separator wall 1340A are spaced one from another to define a first entrance nozzle 1350A. Collector wall 1316, in addition to forming a part of trough or grease trap 1314 on one side thereof, is in spaced relation to connecting wall 1344A to define a first outlet orifice 1352A on the opposite side thereof from trough or grease trap 1314. Connecting wall 1344A is further in spaced relation to inlet separator wall 1340B to define a second entrance nozzle 1350B, and collector wall 1334A is in spaced relation to connecting wall 1344B to define a second outlet orifice 1352B. Additional adjacent filter modules are positioned similarly one to another to define additional entrance nozzles and outlet orifices on opposite faces of filter 1300. Some of the corresponding structures of and defined by filter module 1308C also are identified in FIG. 20, with the suffix "C" as part of the reference number.

End module 1307 is a simple U-shape (FIG. 24), similar to the second portions of the filter modules described, to define the last inlet and outlet orifices at one side of the filter. Top channel 1302 and bottom channel 1304 are U-channels to engage opposite open ends of end modules 1306, 1307 and filter modules 1308. Bottom channel 1304 defines a plurality of outlets, and may provide one for each trough or grease trap provided in the filter. The top and bottom channels can be secured to the modules by releasable fasteners such as screws, or by more permanent connection such as welding, brazing, rivets or the like. By selecting the desired length for top and bottom channels 1302, 1304 and the appropriate number of filter modules 1308 to be used along with suitable end modules 1306 and 1307, a filter of desired size can be assembled easily and quickly. Further, the components including top channel 1302, bottom channel 1304, and modules 1306, 1307 and filter modules 1308 are all easily manufactured by simple metal forming techniques of bending.

Figure 24:
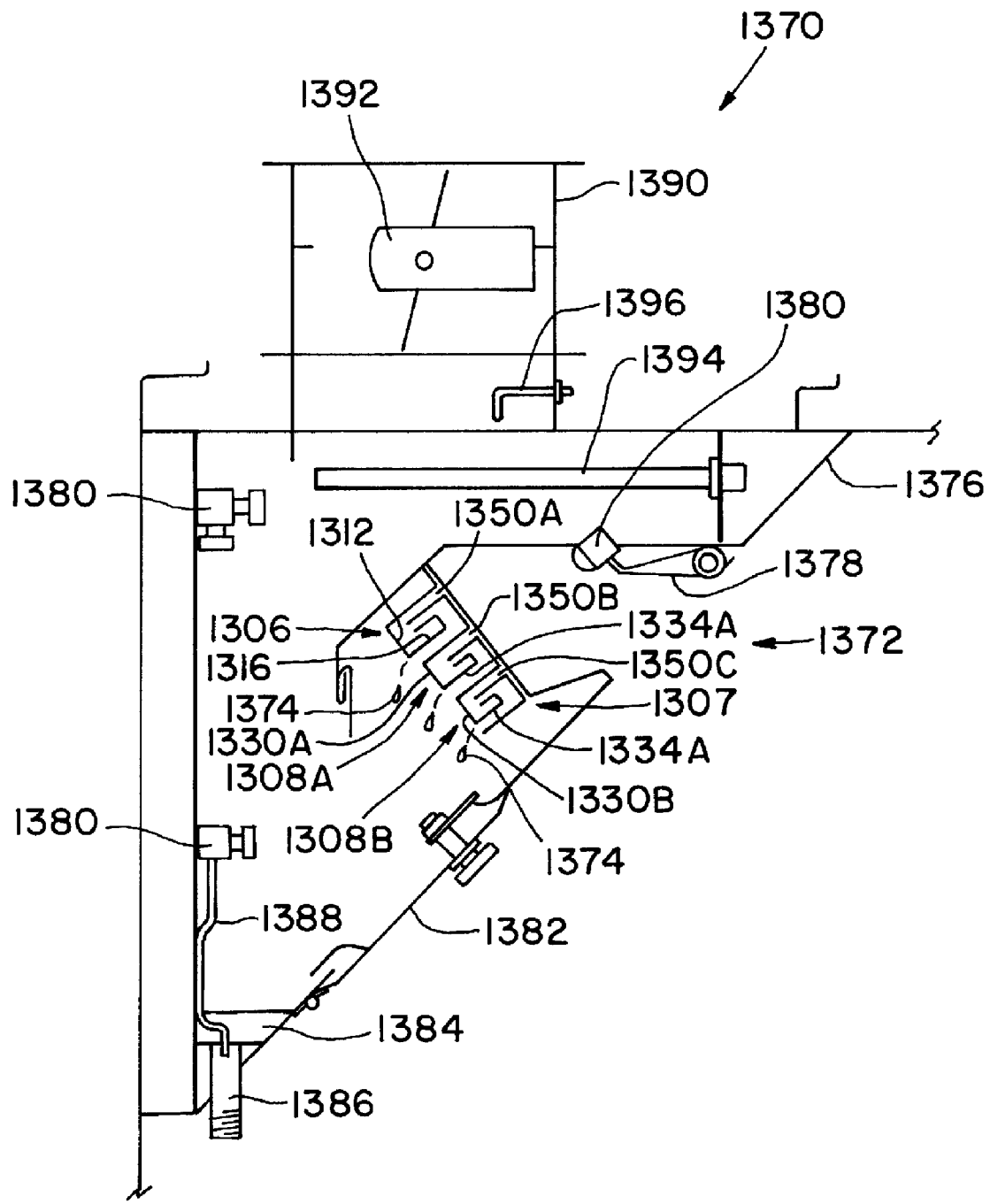
FIG. 24 is a schematic illustration of yet another embodiment of the present invention.

FIG. 24 illustrates a system 1370 utilizing a modular filter 1372 similar to filter 1300, but shown simplified to include only end modules 1306, 1307 and filter modules 1308A and 1308B. Filter 1372 is canted downwardly from the inlet side thereof at entrance nozzles 1350A, 1350B and 1350C. Contaminants 1374 accumulate at the transitions from impact plates 1312, 1330A, 1330B and collecting walls 1316, 1334A, 1334B for draining from filter 1372. System 1370 is shown to further include an exhaust hood 1376 including an inlet fire damper 1378. An intermittent wash system includes one or more wash manifold 1380 for cleaning. A wash access door 1382 is provided in hood 1376 beneath filter 1372. A gutter 1384 in the bottom of hood 1376 empties into a drain 1386. A cleaning fluid line 1388 discharges cleaning fluid into drain 1386 during routine cleaning cycles. Cleaned air is discharged through a discharge duct 1390 having a control damper 1392 at the top of hood 1376. Temperature and pressure sensing and control systems 1394, 1396 are provided. In operation, contaminated air enters hood 1376 through an opening controlled by damper 1378 and enters filter 1372 via entrance nozzles 1350A, 1350B and 1350C. After contaminants 1374 are removed therefrom, the cleaned air flows from filter 1372 through hood 1376 to discharge duct 1390.

Figure 7:
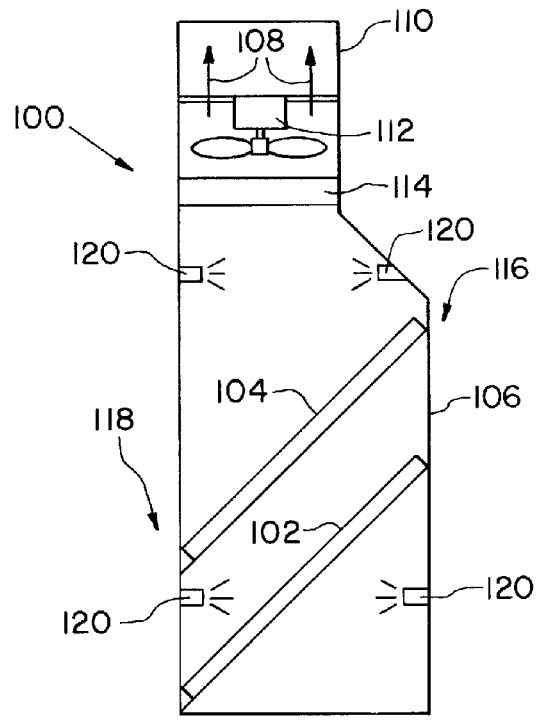
FIG. 7 is a schematic illustration of an exhaust hood system in which impact filters in accordance with the present invention are used.
Figure 21:
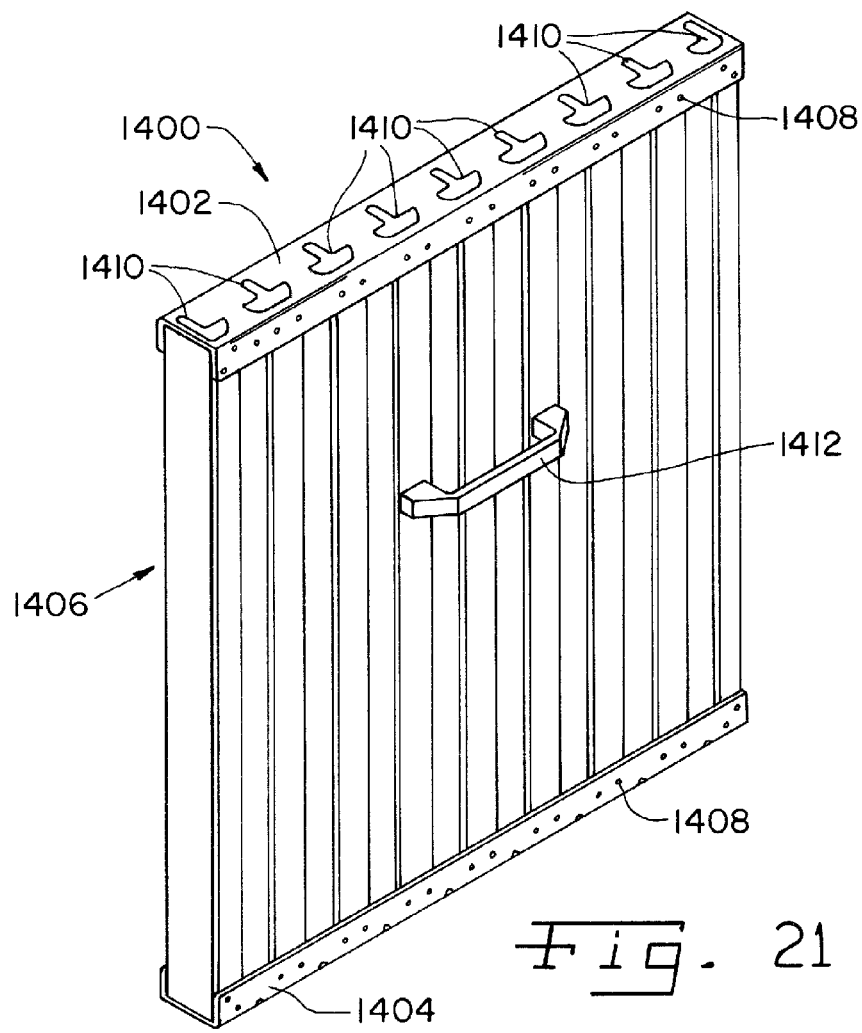
FIG. 21 is a perspective view still a further embodiment of the present invention that facilitates in place washing of the impact filter.
Figure 22:
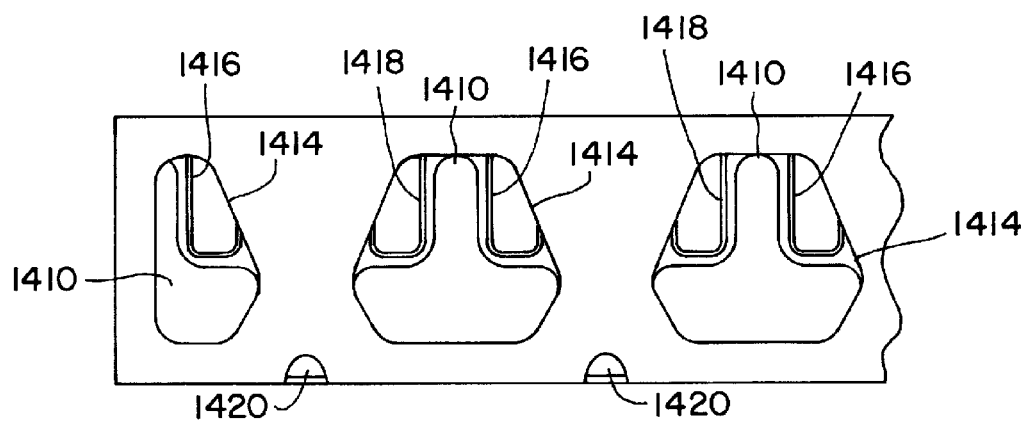
FIG. 22 is an end view of the embodiment shown in FIG. 21.

Filters of the present invention can be cleaned in place by supplying a spray of cleaning fluid through the various nozzles of the filters, as shown in FIG. 7. Filters of the present invention can be cleaned also by removal and disassembly, to clean the various component parts thereof individually. FIGS. 21 and 22 illustrate an embodiment of the present invention in which cleaning is further facilitated. Impact filter 1400 is similar in construction to the embodiment shown in FIG. 17. However, since disassembly for cleaning is not required, a top channel 1402 and a bottom channel 1404 can be secured to filtering structure 1406 by rivets 1408 or other permanent fastener or fastening technique. A plurality of rivets 1408 or other fasteners can be used, only one of which has been labeled with a reference numeral in each top channel 1402 and bottom channel 1404. Wash orifices 1410 are provided in top channel 1402 to admit wash solution to filter 1400 during a cleaning cycle, which may be performed in place or by removing filter 1400 from an installed position to a cleaning location. A handle 1412 is provided to facilitate handling of filter 1400. Outlet holes 1414 are provided in bottom channel 1404 for the removal of wash fluid supplied through wash orifices 1410. As shown in FIG. 22, wash orifices 1410 are designed to not align directly with ends of troughs 1416 and 1418; however, outlet holes 1414 span at least portions of the opposite ends of troughs 1416, 1418. Outlet holes 1414 also receive grease or other contaminants from troughs 1416, 1418 during normal operation of filter 1400. Since troughs 1416 and 1418 are exposed only at one end, internal pressure control is facilitated. Drain holes 1420 are provided in bottom channel 1404 for releasing any liquid build up along edges of the channel.

Still other variations are contemplated by the present invention. For example, a single impact filter of the present invention can have multiple stages for collecting and trapping grease particles along a path through the filter. Initial stages can be designed to collect larger particles, and subsequent stages progressively smaller particles, with the final stage collecting the smallest particles. Multiple banks of collectors can be used as shown in system 22, including more than two individual banks of collectors as shown. Further, one or more of the banks can be optimized for multiple stage particle collection.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An air cleaning system comprising:
   a duct;
   an air mover associated with said duct for moving air through said duct; and
   an impact filter in air flow communication with said duct, said impact filter including:
   an entrance panel defining a nozzle having a nozzle diameter, said nozzle having a length to accelerate an air stream and contaminants entrained in the air stream to similar velocities;
   an outlet panel overlying said entrance panel and defining an outlet;
   said panels associated one with the other and defining an indirect airflow path from said nozzle to said outlet;
   an impact surface confronting said nozzle in spaced relation, said impact surface spaced from said nozzle by a distance of between about one-half said nozzle diameter and ten times said nozzle diameter;
   a baffle associated with said impact surface for guiding air away from said impact surface on one side of said baffle; and
   a contaminant trough on an opposite side of said baffle and associated with said impact surface and said baffle, said contaminant trough being substantially enclosed, and having a contaminant entrance defined by a space between said impact surface and said baffle, said space between said impact surface and said baffle being larger than said distance between said impact surface and said nozzle, said baffle separating an air flow stream on said one side of said baffle from said contaminant trough on said opposite side of said baffle.

2. The air cleaning system of claim 1, said contaminant trough including a collector wall contiguous with and angularly oriented to said impact surface, a trough bottom contiguous with said collector wall, and said baffle being contiguous with said bottom and extending from said bottom to near but spaced from said impact surface.

3. The air cleaning system of claim 2, said baffle and said collector wall being substantially parallel.

4. The air cleaning system of claim 1, including a wash system having a wash nozzle directed toward said impact filter.

5. The air cleaning system of claim 1, said trough being angularly oriented, with a first end of said trough being higher than a second end of said trough and having a drain opening at the lower end.

6. The air cleaning system of claim 1, including a second impact filter disposed in series air flow communication with said first mentioned impact filter.

7. The air cleaning system of claim 1, including at least one of an ultraviolet light source and an electrostatic precipitator in flow communication with and downstream of said impact filter.

8. A kitchen exhaust system comprising:
an exhaust hood;
an impact filter in flow communication with said hood;
at least one wash nozzle disposed in said hood; and
a secondary air cleaning device in flow communication with said hood downstream from said impact filter, said secondary air cleaning device including at least one of a second impact filter, a UV light and an electrostatic precipitator;
said impact filter and said second impact filter when present each comprising:
  a nozzle having a nozzle diameter and a nozzle length, said nozzle length being sufficient to accelerate an air stream and contaminants to be removed from the air stream to similar velocities;
  an impact surface confronting said nozzle and spaced from said nozzle by a distance of between about one-half said nozzle diameter and ten times said nozzle diameter;
  a substantially enclosed contaminant trough associated with said impact surface; and
  a baffle forming a part of said contaminant trough and defining a contaminant entrance to said contaminant trough by a space between said impact surface and said baffle, said space between said impact surface and said baffle being larger than said distance between said impact surface and said nozzle, said baffle separating said contaminant trough from an air flow stream on opposite sides of said baffle.

9. The kitchen exhaust system of claim 8, said impact filter being angularly oriented and having a drain opening for draining collected contaminants therefrom.

10. An impact filter for removing contaminants entrained in an air stream, said filter comprising:
an entrance nozzle having a nozzle diameter;
an impact plate confronting said nozzle and spaced from said nozzle by a distance of between about one-half said nozzle diameter and ten times said nozzle diameter;
a baffle associated with said impact plate for guiding air flow away from said impact plate on one side of said baffle, said baffle and said impact plate defining a space therebetween greater than said distance by which said impact plate is spaced from said nozzle; and
a trough disposed on an opposite side of said baffle outwardly of said baffle relative to said nozzle, said trough having a trough bottom a greater distance from said impact plate than said space between said impact plate and said baffle, said baffle separating an airflow area on said one side of said baffle from said trough on said opposite side of said baffle.

11. The impact filter of claim 10, said baffle being a wall of said trough.

12. The impact filter of claim 11, including a lip on an edge of said baffle adjacent said space, said lip angling into said trough.

13. The impact filter of claim 10, said trough bottom being one of flat, rounded and pointed.

14. The impact filter of claim 10, including;
first and second baffles associated with said impact plate on opposite sides of said nozzle for guiding air flow away from said impact plate, said baffles and said impact plate defining spaces therebetween greater than said distance by which said impact plate is spaced from said nozzle; and
first and second troughs disposed outwardly of said first and second baffles, respectively, relative to said nozzle, said troughs each having a trough bottom a greater distance from said impact plate than said spaces between said impact plate and said baffles.

15. The impact filter of claim 10, including:
an entrance panel defining said entrance nozzle, said nozzle being elongated and having an elongated nozzle outlet; and
an exit panel associated with said entrance panel and defining an elongated exit orifice.

16. The impact filter of claim 15, said entrance panel and said exit panel overlying each other and having an entrance side and an exit side, said nozzle extending from said entrance side toward said impact plate substantially at said exit side, and said trough bottom being closer to said entrance side than said nozzle outlet is to said entrance side.

17. The impact filter of claim 15, said entrance panel defining a plurality of entrance nozzles, said exit panel defining a plurality of elongated exit orifices, and an impact plate and two said troughs associated with each said entrance nozzle.

18. The impact filter of claim 15, said exit orifices defined between adjacent said troughs associated with different said impact plates.

19. The impact filter of claim 10, including a plurality of filter modules disposed in series, interleaved relation; each said filter module having a said trough; and adjacent said filter modules disposed in spaced relation to define a said entrance nozzle and an exit orifice therebetween.

20. The impact filter of claim 10, further comprising:
said nozzle having a nozzle inlet and a nozzle outlet;
said impact plate extending laterally beyond said nozzle outlet; and
said trough including:
  a first trough side contiguous with and extending away from said impact plate;
  said trough bottom contiguous with and extending from said first trough side toward said nozzle;
  said baffle disposed between said first trough side and said nozzle and being contiguous with and extending from said trough bottom toward said impact plate; and
  a trough inlet defined between said baffle and said impact plate.

21. The impact filter of claim 10, including a wash orifice near an end of said trough for admitting cleaning fluid into said filter.

22. The impact filter of claim 10, further comprising:
a first panel defining a plurality of entrance nozzles;
a second panel defining an impact surface, a contaminant trap and a plurality of outlet orifices; and a hinge connecting said first panel and said second panel allowing said panels to be swung open away from one another and to be closed overlying one another in spaced interdigitation.

23. The impact filter of claim 10, further comprising:

an entrance side and exit side;

said entrance nozzle having an inlet on said entrance side and a nozzle outlet confronted by said impact plate; and an exit orifice outwardly of said trough relative to said nozzle, said exit orifice having an opening in said exit side, said opening defining an area greater than an area defined by said nozzle outlet.

24. The impact filter of claim 10, said entrance nozzle having inwardly tapering sides along at least a portion of a length of said nozzle.

* * * * *